United States Patent [19]
Priaroggia

[11] Patent Number: 4,697,875
[45] Date of Patent: Oct. 6, 1987

[54] PRESSURE RESISTANT SUBMARINE OPTICAL FIBER CABLE

[75] Inventor: Paolo G. Priaroggia, Milan, Italy
[73] Assignee: Societa Cavi Pirelli S.p.A., Milan, Italy
[21] Appl. No.: 864,197
[22] Filed: May 16, 1986

Related U.S. Application Data

[63] Continuation-in-part of Ser. No. 723,039, Apr. 15, 1985, and Ser. No. 723,265, Apr. 15, 1985, Pat. No. 4,676,590.

[30] Foreign Application Priority Data

May 29, 1985 [IT] Italy ................... 20943 A/85

[51] Int. Cl.⁴ ............................................. G02B 6/44
[52] U.S. Cl. .............................. 350/96.23; 174/70 R
[58] Field of Search .................. 174/70 R; 350/96.23

[56] References Cited

U.S. PATENT DOCUMENTS

| | | | |
|---|---|---|---|
| 3,710,006 | 1/1973 | Davis | 350/96.23 X |
| 4,143,942 | 3/1979 | Anderson | 350/96.23 |
| 4,153,332 | 5/1979 | Longoni | 350/96.23 |
| 4,574,192 | 3/1986 | Kitagawa et al. | 350/96.23 X |

FOREIGN PATENT DOCUMENTS

| | | | |
|---|---|---|---|
| 1422956 | 1/1976 | United Kingdom | 350/96.23 |
| 2021282 | 11/1979 | United Kingdom | . |
| 1572299 | 7/1980 | United Kingdom | 350/96.23 |
| 1598540 | 9/1981 | United Kingdom | 350/96.23 |

*Primary Examiner*—John Lee
*Attorney, Agent, or Firm*—Brooks Haidt Haffner & Delahunty

[57] ABSTRACT

A submarine cable with optical fibers which prevents damage to the fibers without the use of an external armor. The cable has a central strand which provides the cable tensile strength and which is surrounded by helically wound and circumferentially spaced tubes which loosely enclose the optical fibers. Helically wound electrical conductors are intermediate and contact the tubes. A layer of plastic material surrounds the tubes and the electrical conductors. The tubes, any spaces in the strand and any spaces radially inwardly of the layer of plastic material are filled with a substantially incompressible fluid, such as a grease or jelly.

6 Claims, 1 Drawing Figure

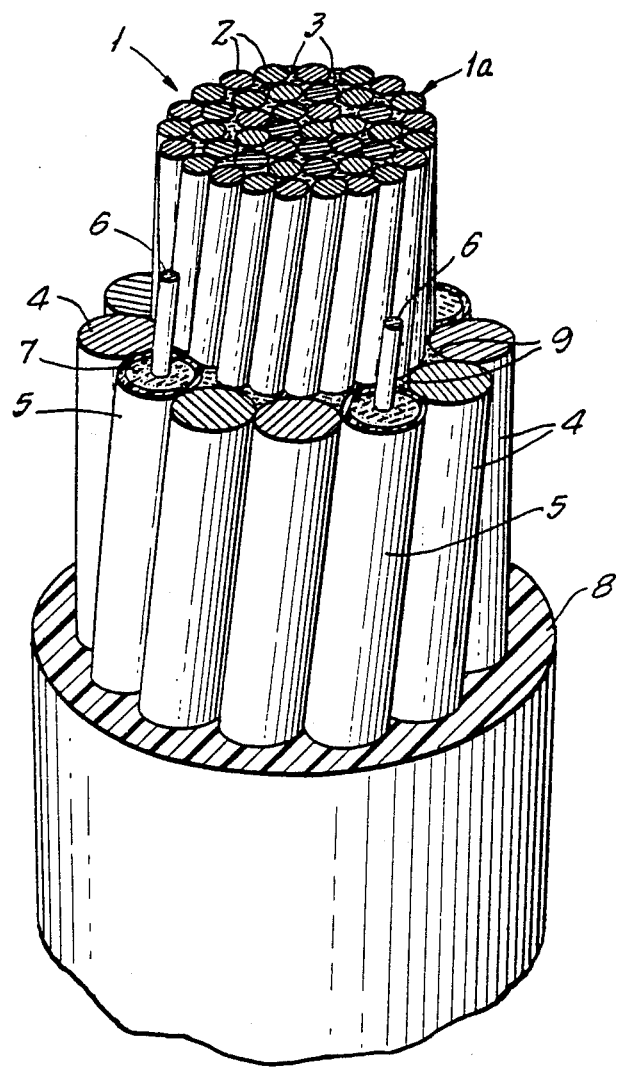

PRESSURE RESISTANT SUBMARINE OPTICAL FIBER CABLE

This application is a continuation-in-part of my co-pending applications Ser. Nos. 723,039 and 723,265, (the latter now U.S. Pat. No. 4,676,590) both filed Apr. 15, 1985 and both entitled "Pressure Resistant Submarine Optical Fiber Cable", and is related to my co-pending application Ser. No. 746,558, filed June 19, 1985 and entitled "Joint for Optical Fiber Submarine Cables". All such applications are assigned to the assignee of this application.

The present invention relates to a submarine optical fiber cable for telecommunication and of the type which incorporates electric conductors for feeding the opto-electronic repeaters for the transmitted signals.

The known optical fiber submarine cables have a sheath and a mechanically resistant armoring, formed by steel wires, which surround an optical core constituted by a member having, on its outer surface, grooves wherein the optical fibers are received.

The electrical conductors incorporated in the known cables, are copper or aluminum wires, or similar wires of good conductivity, which are introduced into the mechanically resistant armoring as a substitute for some of the steel wires forming the armoring.

Since copper, aluminum and similar wires have a lower mechanical resistance as compared to steel, the dimensions of the cable armoring must be increased to compensate for the lower mechanical resistance of the wires made of such metals which are present in the armoring.

The increase in the dimensions of the armoring which results from the necessity of having more material added outside the cable's optical core and hence, in a position farther away from the longitudinal axis of the cable which is also the neutral axis of flexing, causes an increase in rigidity of the cable.

For obviating such problem, it has already been proposed to utilize, as an electrical conductor incorporated in the cable, the optical core member by making said member out of a metallic material with a high electrical conductivity, such as copper, aluminum, etc. The drawback of this proposal lies in the need for making the grooves, which are intended to receive the optical fibers, by machine working of the metallic member which is both complex and difficult.

Examples of known submarine optical fiber cables, of the type involved, are described in U.K. Pat. No. 2,021,282.

Another drawback of the known optical fiber cable incorporating electrical conductors is in the difficulty encountered when forming connections between the conductors and between the optical fibers during the formation of cable joints and when connecting optical fiber cables to the opto-electronic repeaters for the signals transmitted by said optical fiber.

These difficulties are due not only to the presence of a mechanically resistant armoring around the optical fibers, but also to the fact that the conductors overlie the optical fibers, or vice-versa.

For example, in the case in which the conductors are incorporated in the armoring, a connection between the optical fibers is obstructed by the presence, in an overlying position, of the conductors or of the connections between these latter when such connections have already been made.

Even in the case in which the conductor is the member constituting the optical core of the cable, the execution of the connections between the optical fibers can be hampered by the presence of the already executed connections between the conductors which extend from the opto-electronic repeaters and the member constituting the cable conductor.

When considering that, whenever connections, and in particular, connections between optical fibers requiring a considerable accuracy and precision of execution, are difficult to carry out, such connections can prove to be quite unreliable which results in an insufficient reliability for the known optical fiber cables incorporating electrical conductors.

Other drawbacks in the known submarine optical fiber cables, are the heavy weight thereof and their considerable rigidity with respect to flexing which render the cable-laying and/or cableraising operations difficult.

One object of the present invention is a submarine optical fiber cable of the type incorporating electrical conductors used, for example, for feeding opto-electronic repeaters, which is without the drawbacks set forth hereinbefore.

In accordance with the present invention, a submarine optical fiber, telecommunications cable comprises a mechanically resistant armoring, a sheath which encloses a plurality of optical fibers and conductors for feeding the opto-electronic repeaters of the signals transmitted by the optical fibers which is characterized by the fact that the mechanically resistant armoring is a compact, anti-torsional rope which has the spaces between the component wires filled with a practically incompressible fluid. The rope is positioned at the radially innermost zone of the cable, and a plurality of conductors and a plurality of tubes, the latter filled with an incompressible fluid and loosely housing at least one optical fiber, are wound helically around the rope with at least one electrical conductor being interposed between pairs of adjacent tubes. A layer of plastic material covers the tubes-conductors complex and engages them at its radially innermost surface. The spaces between the tubes-conductors complex and the rope, which are not occupied by the plastic material are also filled with an incompressible fluid.

The term "incompressible fluid" used in this application means liquid substances, preferably viscous substances which may have a high viscosity. Gases are excluded from the scope of such term.

Other objects and advantages of the invention will be apparent to those skilled in the art from the following detailed description of preferred embodiments of the invention, which description should be considered in conjunction with the accompanying drawing the single FIGURE of which is a partly cutaway, perspective view of a cable of the invention.

As can be seen in the drawing, the cable 1 has an armoring comprising a compact anti-torsional rope 1a which forms the radially innermost portion of the cable.

The rope 1a has dimensions such that the rope 1a will substantially resist the tension stresses acting on the cable 1 during the cable-laying or the cable-raising operations. The rope 1a is formed by a plurality of wires 2 made of a material with a high mechanical resistance to stresses, for example, wires of steel, aromatic polyamids, carbon fibers, and such like.

The spaces 3 between the wires 2 are filled with a substantially incompressible fluid, for example, a silicone grease, a petroleum jelly, and such like.

Around the rope 1a, there are helically wound conductors 4, for example, made of copper or aluminum, and plastic or metallic tubes 5 forming a single layer.

The helicoidal windings of the conductors 4 and of the tubes 5 can be either closed-helix or open-helix, the latter term meaning that the lay-out of the conductors 4 and of the tubes 5 is constituted by S-shaped lengths alternating with Z-shaped lengths.

The tubes 5 loosely house or receive at least one optical fiber 6, and are filled with an incompressible fluid 7, for example, silicone grease, a petroleum jelly, and such like.

The conductors 4 can either diameters larger or smaller than, or the same as, the outer diameter of the tubes 5. Preferably, the conductors 4 have a diameter which is equal to the outer diameter of the tubes 5. For example, the diameter of the conductors and the outer diameter of the tubes can be between 1.8 mm and 3 mm.

By way of example, the tubes 5 can have an internal diameter which is between 0.75 mm and 1.5 mm, and the wall thickness thereof is chosen as a function of the degree of filling of the tubes with an incompressible fluid.

The tubes 5 and the conductors 4 are in contact with each other, and they are also in contact with the rope 1a forming a crown around it. In the drawing, each tube 5 is between two pairs of conductors 4 and is in contact with each of the adjacent conductors 4.

Also, in the drawing, two conductors 4 are interposed inbetween pairs of tubes 5, but the number of conductors 4 interposed between pairs of tubes 5 can be of any number whatsoever and may not be equal for all the pairs of tubes 5. What is desirable is that each tube 5 be adjacent to and in contact with two conductors 4 which act as a support for the walls of the tubes 5.

A plastic layer 8 which is obtained by extrusion, for example, of a polyolefin, such as polyethylene, or of polyvinyl chloride, or of nylon, and such like is applied over the tubes 5 and the conductors 4. The layer 8 forms the cable sheath. Over the layer 8, there can be disposed a watertight metallic sheath (not shown), the thickness of which is on the order of some tens of millimeters. It is not necessary to vary the thickness of the metallic sheath with the laying depth for which the cable is intended.

On the outermost surface of the cable, there can be disposed the usual anti-corrosive protection layers which are normally employed in submarine cables.

The radially innermost surface of the layer 8 engages with the radially outermost surfaces of the tubes 5 and the conductors 4 and penetrates between them, filling the spaces 9 existing between the tubes 5 and the conductors 4 and between them and the rope 1a.

As an alternative (as shown in the drawing), the spaces 9 between the tubes 5 and the conductors 4 and the rope 1a are filled up with the same incompressible fluid used to fill the spaces 3 between the wires 2 of the rope 1a. In this case, the radially innermost surface of the layer 8 is limited to engaging the radially outermost surfaces of the tubes 5 and the conductors 4.

The thickness of the layer 8 can be any desired thickness, but preferably, it is not less than 2 mm for better resisting any formation of arborescences which could appear therein. In a cable according to the invention, the return conductor, for the direct current feeding of the opto-electronic repeaters, is formed by the sea. Under this condition, since it is interposed between the conductors 4 and the sea, the plastic layer 8, forming the cable sheath, is subjected to electrical stresses.

From the description given and from the following considerations, it will be understood by those skilled in the art that with a cable of the invention, the objects set forth can be achieved.

With cables according to the invention, the making of joints and the connection with opto-electronic repeaters of the signals transmitted by the optical fibers is easier. In fact, with the cables according to the invention, armorings around the tubes 5 and the conductors 4 which could provide obstacles to the connecting operations do not exist.

Moreover, the tubes 5 and the conductors 4 are adjacent to each other, and this prevents any reciprocal obstruction during the making of the two types of connections which contributes to the reliability of these connections and hence, to the reliability of the cables.

The ease in making the joints and the connections with the repeaters is the greatest whenever the spaces 9, between the tubes 5 - conductors 4 complex, are filled with an incompressible fluid since this solution facilitates the removal of a part of the sheath layer 8 from the cables, removal of such sheath 8 being necessary for the purpose of carrying out these operations.

In the cables according to the invention, the tubes 5 housing the optical fibers 6 are correctly disposed around the armoring and held stably in position on the latter due to the presence of conductors 4 which preferably have a diameter which is equal to that of the tubes 5 which are adjacent to and in contact with them. This means that, during the formation, by extrusion, of the plastic sheath 8, the configuration of the tubes 5 is not altered. The correct disposition of the tubes 5 and the conductors 4 contributes to facilitating the making of the joints and the connections with the opto-electronic repeaters.

The cables according to the invention also have a weight reduced to the minimum, as well as the maximum of flexibility.

In fact, the provision of a mechanically resistant armoring consisting of a compact anti-torsional rope disposed in the radially innermost zone of the cable and dimensioned for resisting tension stresses during the cable-laying or cable-raising operations, means that the cable has a minimum weight.

Moreover, the rope forming the cable armoring has its own axis coinciding with the cable axis, which is the neutral axis of flexing and the electrical conductors of the cable are in contact with it.

Hence, the wires forming the rope and the conductors are at the minimum distance possible from the neutral axis of the cable, and this fact means that the cables of the invention have the maximum of flexibility.

Moreover, the presence of the conductors 4, which are solid metallic bodies resting on the compact rope 1a and which are adjacent to and in contact with the tubes 5, give support to the tube-walls and provide protection for these tubes, and for the optical fibers housed inside them from the inevitable impacts which the cable undergoes, during the cable-laying and/or the cable-raising operations, in spite of the absence (considered to be indispensable in the known submarine cables) of a mechanically resistant armoring disposed around the cable zone where the optical fibers to be protected are situated.

The cables according to the invention (in spite of the absence of any whatsoever mechanically-resistant armoring surrounding the zone wherein the optical fibers are positioned), besides protecting the latter, from the impacts of the cables encountered during the laying operation, also present an excellent resistance to hydrostatic pressure, no matter what the laying depth may be, due to the fact that no voids, unfilled with material, exist inside the cables.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A submarine, telecommunication cable comprising:
   an axially disposed and extending armor comprising a strand of wires, said armor having a size and strength sufficient to withstand tension stresses which are applied to the cable during laying and raising thereof into and out of water;
   a plurality of tubes helically wound around said armor in circumferentially spaced relation to each other;
   a plurality of electrical conductors helically wound around said armor with at least one electrical conductor intermediate each pair of said plurality of tubes, each said electrical conductor being a solid metallic body which is substantially incompressible under the cable operation pressures and which is substantially homogeneous in cross-section and each said tube being between and in contact with a pair of said conductors adjacent thereto so as to be supported by said pair of conductors;
   a substantially incompressible fluid filling any otherwise empty spaces within said armor including any spaces between said wires;
   at least one optical fiber loosely receive in each of said tubes;
   a substantially incompressible fluid filling the spaces between the interior of said tubes and said optical fibers;
   a layer of plastic material around said tubes and said electrical conductors, the innermost surface of said layer of plastic material contacting said tubes and said electrical conductors without filling spaces intermediate said tubes and said armor and intermediate said conductors and said armor;
   a substantially incompressible fluid filling any otherwise empty spaces within said layer of plastic material including any otherwise empty spaces intermediate said tubes and said armor and intermediate said conductors and said armor; and
   said cable being without armor externally of said layer of plastic material, and hence around said tubes, which, by itself, can withstand teh mechanical stresses to which the cable is subjected in use.

2. A submarine, telecommunication cable as set forth in claim 1, wherein said electrical conductors have diameters substantially equal to the outer diameters of said tubes.

3. A submarine, telecommunication cable as set forth in claim 1 wherein the circumferential spacing of said tubes is equal to the sum of the diameters of said electrical conductors disposed intermediate said tubes whereby said electrical conductors maintain said tubes in fixed circumferential relation.

4. A submarine, telecommunication cable as set forth in claim 1 wherein each said substantially incompressible fluid is the same as each other said substantially incompressible fluid.

5. A submarine, telecommunication cable as set forth in claim 1 wherein the third-mentioned said incompressible fluid is intermediate said armor, on the one hand, and said tubes and said electrical conductors, on the other hand.

6. A submarine, telecommunication cable as set forth in claim 1 wherein said tubes and said electrical conductors are in contact with said armor.

* * * * *